| (12) United States Patent<br>Fasth et al. | (10) Patent No.: US 12,448,035 B2<br>(45) Date of Patent: Oct. 21, 2025 |
|---|---|

(54) METHOD FOR IN-MOTION FRICTION ESTIMATION BASED ON STEERING PULSES, COMPUTER PROGRAM, COMPUTER READABLE MEDIUM, CONTROL DEVICE AND VEHICLE

(71) Applicant: VOLVO TRUCK CORPORATION, Gothenburg (SE)

(72) Inventors: Marcus Fasth, Trollhättan (SE); Umur Erdinc, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 211 days.

(21) Appl. No.: 18/555,380

(22) PCT Filed: Apr. 16, 2021

(86) PCT No.: PCT/EP2021/059954
§ 371 (c)(1),
(2) Date: Oct. 13, 2023

(87) PCT Pub. No.: WO2022/218547
PCT Pub. Date: Oct. 20, 2022

(65) Prior Publication Data
US 2024/0383529 A1 Nov. 21, 2024

(51) Int. Cl.
*B62D 6/00* (2006.01)
*B60W 10/04* (2006.01)
(Continued)

(52) U.S. Cl.
CPC ............. *B62D 6/006* (2013.01); *B60W 10/04* (2013.01); *B60W 10/184* (2013.01);
(Continued)

(58) Field of Classification Search
CPC .... B60W 10/04; B60W 10/184; B60W 10/20; B60W 40/12; B60W 50/14;
(Continued)

(56) References Cited

U.S. PATENT DOCUMENTS 4,882,693 A * 11/1989 Yopp ...................... B60T 8/172
73/9
5,747,682 A * 5/1998 Hirano ................ B60T 8/17551
73/115.07

(Continued)

FOREIGN PATENT DOCUMENTS

DE 102012220238 A1 5/2014
DE 102013009059 A1 12/2014
(Continued)

OTHER PUBLICATIONS

European Communication pursuant to Rules 161(1) and 162 EPC dated Nov. 23, 2023 in corresponding European Patent Application No. 21720416.3, 3 pages.

(Continued)

*Primary Examiner* — Phutthiwat Wongwian
*Assistant Examiner* — Susan E Scharpf
(74) *Attorney, Agent, or Firm* — Venable LLP; Jeffri A. Kaminski

(57) ABSTRACT

A method performed in a control unit of a heavy-duty vehicle for estimating road friction, the method comprising, while the vehicle is in motion, generating a steering pulse having a limited time duration and a limited magnitude, measuring a response by the vehicle to the steering pulse, and estimating a road friction value based on the measured response by the vehicle.

22 Claims, 4 Drawing Sheets

(51) Int. Cl.
  *B60W 10/184* (2012.01)
  *B60W 10/20* (2006.01)
  *B60W 40/068* (2012.01)
  *B60W 40/12* (2012.01)
  *B60W 50/00* (2006.01)
  *B60W 50/14* (2020.01)

(52) U.S. Cl.
  CPC ............ *B60W 10/20* (2013.01); *B60W 40/12* (2013.01); *B60W 50/14* (2013.01); *B60W 40/068* (2013.01); *B60W 2050/0031* (2013.01); *B60W 2050/0037* (2013.01); *B60W 2050/0057* (2013.01); *B60W 2050/0075* (2013.01); *B60W 2300/12* (2013.01); *B60W 2510/202* (2013.01); *B60W 2520/10* (2013.01); *B60W 2520/125* (2013.01); *B60W 2520/14* (2013.01); *B60W 2530/10* (2013.01); *B60W 2530/201* (2020.02); *B60W 2540/215* (2020.02); *B60W 2710/20* (2013.01); *B60W 2710/207* (2013.01)

(58) Field of Classification Search
  CPC ....... B60W 40/068; B60W 2050/0031; B60W 2050/0037; B60W 2050/0057; B60W 2050/0075; B60W 2300/12; B60W 2510/202; B60W 2520/10; B60W 2520/125; B60W 2520/14; B60W 2530/10; B60W 2530/201; B60W 2540/215; B60W 2710/20; B60W 2710/207; B62D 6/006
  See application file for complete search history.

(56) References Cited

U.S. PATENT DOCUMENTS

| | | | |
|---|---|---|---|
| 9,708,001 B2 * | 7/2017 | Arakane | ................ B62D 6/006 |
| 2004/0133330 A1 | 7/2004 | Ono et al. | |
| 2005/0005691 A1 | 1/2005 | Ono et al. | |
| 2006/0041365 A1 | 2/2006 | Mori | |
| 2008/0221769 A1 | 9/2008 | Matsuno | |
| 2010/0114449 A1 | 5/2010 | Shiozawa et al. | |
| 2011/0251759 A1 | 10/2011 | Mack et al. | |
| 2012/0095649 A1* | 4/2012 | Klier | ..................... B62D 7/159 701/41 |
| 2013/0074576 A1* | 3/2013 | Kouchi | ................... B60T 8/172 73/9 |
| 2016/0280251 A1 | 9/2016 | George et al. | |
| 2017/0254897 A1* | 9/2017 | Tron | ....................... G01S 13/87 |
| 2018/0043900 A1 | 2/2018 | Sabri et al. | |
| 2019/0084570 A1 | 3/2019 | Suzuki | |
| 2019/0092335 A1 | 3/2019 | Kim | |
| 2020/0262468 A1 | 8/2020 | George et al. | |
| 2024/0367659 A1* | 11/2024 | Rydström | ............... G01S 13/88 |

FOREIGN PATENT DOCUMENTS

| | | | | |
|---|---|---|---|---|
| DE | 102014012685 A1 | | 2/2016 | |
| DE | 102018201462 A1 | | 8/2019 | |
| DE | 102019202771 A1 | | 9/2020 | |
| DE | 102019202772 A1 | | 9/2020 | |
| DE | 102019203195 A1 | * | 9/2020 | .......... B60W 40/068 |
| EP | 323066 A | * | 7/1989 | ......... B60K 31/0075 |
| EP | 3562702 A1 | | 11/2019 | |
| JP | H10288559 A | | 10/1998 | |
| JP | 2008170237 A | | 7/2008 | |
| JP | 2008195203 A | | 8/2008 | |
| JP | 2009006940 A | | 1/2009 | |
| JP | 2010126113 A | | 6/2010 | |
| KR | 20080098176 A | | 11/2008 | |
| KR | 101172384 B1 | | 8/2012 | |
| WO | 2018124971 A1 | | 7/2018 | |
| WO | 2019189096 A1 | | 10/2019 | |

OTHER PUBLICATIONS

International Search Report and Written Opinion of the International Searching Authority in corresponding International Application No. PCT/EP2021/059954 mailed Jan. 21, 2022 (16 pages).
Written Opinion of the International Preliminary Examining Authority in corresponding International Application No. PCT/EP2021/059954 mailed May 31, 2022 (7 pages).
International Preliminary Report on Patentability in corresponding International Application No. PCT/EP2021/059954 mailed Jul. 17, 2023 (8 pages).

* cited by examiner

METHOD FOR IN-MOTION FRICTION ESTIMATION BASED ON STEERING PULSES, COMPUTER PROGRAM, COMPUTER READABLE MEDIUM, CONTROL DEVICE AND VEHICLE

CROSS-REFERENCE TO RELATED APPLICATIONS

This application is a U.S. National Stage application of PCT/EP2021/059954, filed Apr. 16, 2021 and published on Oct. 20, 2022, as WO 2022/218547, all of which is hereby incorporated by reference in its entirety.

TECHNICAL FIELD

The present disclosure relates to methods and control units for estimating road friction. The methods are particularly suitable for use with heavy-duty vehicles, such as trucks and semi-trailers. The invention can, however, also be applied in other types of heavy-duty vehicles, e.g., in construction equipment and in mining vehicles.

BACKGROUND

Road friction plays an important part in the control of most vehicles, mainly since it limits the wheel forces that can be generated by the vehicle at any given point in time. For instance, the road friction coefficient $\mu$ together with normal force $F_z$ acting on a tyre limits the achievable longitudinal tyre force $F_x$ as $F_x \leq \mu F_z$. Road friction also determines how much lateral wheel force $F_y$ that can be supported by a tyre without excessive lateral wheel slip, and therefore determines how fast a vehicle can enter a road turn without driving off the road.

Drivers of manually driven vehicles are often aware, at least roughly, of current road conditions, e.g., if the road is wet or icy, and can adjust vehicle motion such as speed accordingly. However, conditions may change rapidly, and not all drivers are experienced enough to accurately determine road friction. Also, autonomous vehicles lacking a driver would of course benefit from knowing at least approximately what the road frictions conditions. Thus, methods for determining road frictions conditions are desired.

A lot of work has gone into designing methods for automatically determining road friction based on applying controlled amounts of torque by different vehicle propulsion devices. Some such examples include DE102012220238, DE102019202772 and EP3562702.

JPH10288559 and JP2008170237 also disclose methods for automatically determining road friction. These methods are instead based on applying steering to estimate road friction.

DE 10 2019 203195 A1 discloses a method for measuring a contact parameter of a subsurface.

DE 10 2014 012685 A1 discloses a method of active lateral force and friction coefficient estimation which performs a defined steering movement on one or more vehicle wheels and uses the resulting motion quantities in relation to a reference state to obtain information about the lateral force potential on one or more vehicle wheels.

DE 10 2018 201462 A1 discloses a method for operating a motor vehicle, wherein a coefficient of friction between at least one tire of the motor vehicle and a ground travelled by the motor vehicle is determined.

DE 10 2013 009059 A1 discloses a method for determining the road excitation steering angle, calculating the static and sliding friction values which are required for regulating the driving dynamics.

However, despite the available techniques for automatic road friction determination, there is a continuing need for more versatile and accurate methods for estimating road friction.

SUMMARY

It is an object of the present disclosure to provide techniques which alleviate or overcome at least some of the above-mentioned problems and to provide methods for road friction estimation. A particular focus of the present disclosure is to provide methods which can be used while the vehicle is in motion, to complement the literature describing methods which can only be performed when the vehicle is stationary, i.e., parked or at least in a stand-still state. This object is at least in part obtained by a method performed in a control unit of a heavy-duty vehicle for estimating road friction. The method comprises, while the vehicle is in motion, generating a steering pulse having a limited time duration and a limited magnitude configured so as to cause a vehicle motion response to the steering pulse below a pre-determined level. The method also comprises measuring a response by the vehicle to the steering pulse and estimating a road friction value based on the measured response by the vehicle.

Due to the limited time duration and limited magnitude, the vehicle motion will not be significantly affected by the steering pulse, which means that the method can be performed while the vehicle is in motion. This is an advantage, since it allows a vehicle to evaluate road friction periodically or on demand in a reliable manner.

According to aspects, the time duration and/or the magnitude of the steering pulse is limited in dependence of one or more dynamic properties of the heavy-duty vehicle. This means that the steering pulse is designed so as to not cause a too strong vehicle motion response. It is an advantage that the time duration and/or the magnitude of the steering pulse can be adapted to a given vehicle, since different vehicles have different dynamic properties. By configuring the properties of the steering pulse in dependence of the dynamic properties of the heavy-duty vehicle, a customization can be performed which often results in a significantly improved performance.

According to aspects, the method comprises generating the steering pulse as an impulse comprising an abruptly applied steering angle followed by an immediate reversal of the applied steering angle. Thus, the steering angle reverses back to its original value after the pulse, thereby allowing the vehicle to continue along its intended motion path after the pulse has been executed.

According to aspects, the method comprises generating the steering pulse as a step function comprising an abruptly applied steering angle. This step function may result in a response which is more easily measured, where transient behaviors can be more easily observed. The step function will eventually have to be compensated for, but this can also be performed by other motion support devices, such as friction brakes and the like. In other words, according to aspects, the method comprises compensating for the steering pulse by one or more other motion support devices of the vehicle.

Generally, it is desirable to have a stable estimation performance which is independent of external factors such as driving conditions, road type and the like, and also vehicle internal factors such as vehicle type, wheelbase, and cargo weight. To make the friction estimation more independent of these external and internal factors, the steering pulse can be adapted to the current operating conditions.

According to some such aspects, the method comprises configuring the magnitude and/or the time duration of the steering pulse in dependence of a type of the heavy-duty vehicle. It is appreciated that different types of vehicles have different dynamic properties. Thus, a steering pulse which is suitable for use with one type of vehicle may not be suitable for another type, and vice versa. By configuring the steering pulse specifically for a given type of vehicle, the accuracy in the estimated road friction can be improved.

According to other such aspects, the method comprises configuring the magnitude and/or the time duration of the steering pulse in dependence of a cargo load or gross weight of the heavy-duty vehicle. The weight of the vehicle has an impact on the response of the vehicle to a steering pulse. By adapting the steering pulse to compensate for variation in cargo load and/or vehicle overall weight, a more stable friction estimate can be obtained.

According to further such aspects, the method comprises configuring the magnitude and/or the time duration of the steering pulse in dependence of a current speed of the heavy-duty vehicle. The speed of the vehicle may also have an impact on the response of the vehicle to the applied steering pulse. By adapting the properties of the steering pulse to the vehicle speed, improved estimation performance can be obtained. Vehicle safety is also improved by adapting the steering pulse with respect to vehicle speed.

The method optionally also comprises configuring the magnitude and/or the time duration of the steering pulse in dependence of an operating environment of the heavy-duty vehicle and/or in dependence of a wheelbase of the heavy-duty vehicle. The operating environment and vehicle wheelbase are also likely to impact the vehicle response to the steering pulse. By adapting the properties of the steering pulse to account for variation in these factors, an improved estimation performance can be obtained.

According to aspects, the method comprises generating a steering pulse having a magnitude between 1-5 degrees, and preferably between 2-3 degrees, with a time duration between 0.1-1.0 seconds, and preferably between 0.2-0.5 seconds. These values have been found to give accurate results and to not overly affect vehicle motion in response to the steering pulse.

The response by the vehicle to the applied steering pulse can be measured in many different ways. The different types of possible measurements can be used independently, which brings an advantage of low cost and reduced sensor system complexity. However, by using more than one type of sensor reading to detect vehicle response to the steering pulse, an improved estimation accuracy can be obtained, and also a resilience top erroneous sensor readings, since a level of sensor redundancy has been introduced by the plurality of sensors used in parallel. Thus, according to aspects, the method comprises measuring the response by the vehicle as any of: an applied torque by a power steering system of the vehicle, a vehicle yaw motion resulting from the applied steering pulse, and a lateral force and/or lateral acceleration generated by the applied steering pulse.

According to aspects, the method comprises estimating the road friction value based on a frequency analysis of the measured response. Frequency analysis of the vehicle response has been found to generate reliable and accurate results, which is an advantage. For instance, the method may comprise estimating the road friction value using a machine learning method applied to the measured frequency response.

According to aspects, the method comprises estimating the road friction value based on a software-based model of a tyre of the vehicle. This means that the impact of the tyres can be better accounted for. For instance, a worn tyre may generate a vehicle response similar to that which would be seen at lower friction conditions. By accounting for the state and type of tyre, such effects can be compensated for, resulting in a more accurate road friction estimation.

According to aspects, the method comprises estimating the road friction value based on a magnitude and/or a time duration of the measured response. This is a less complex alternative to the frequency analysis mentioned above. This type of analysis can be used independently or in combination with a frequency analysis.

According to aspects, the method comprises updating a software-based model of a tyre of the vehicle based on the measured response. Thus, advantageously, a more accurate tyre model is obtained. This tyre model can be used to improve general vehicle motion management functions, which is an advantage.

According to aspects, the method comprises triggering a notification to a driver of the vehicle in connection to generating the steering pulse. This brings the additional advantage of informing the driver about the friction estimation. Otherwise, the driver may not realize that friction estimation is being performed, and erroneously interpret any unusual sounds and small vibrations generated by the method as a vehicle fault.

According to aspects, the method comprises generating the steering pulse in response to a request from a driver of the vehicle. This allows the driver to, e.g., manually trigger friction estimation if friction conditions are uncertain.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
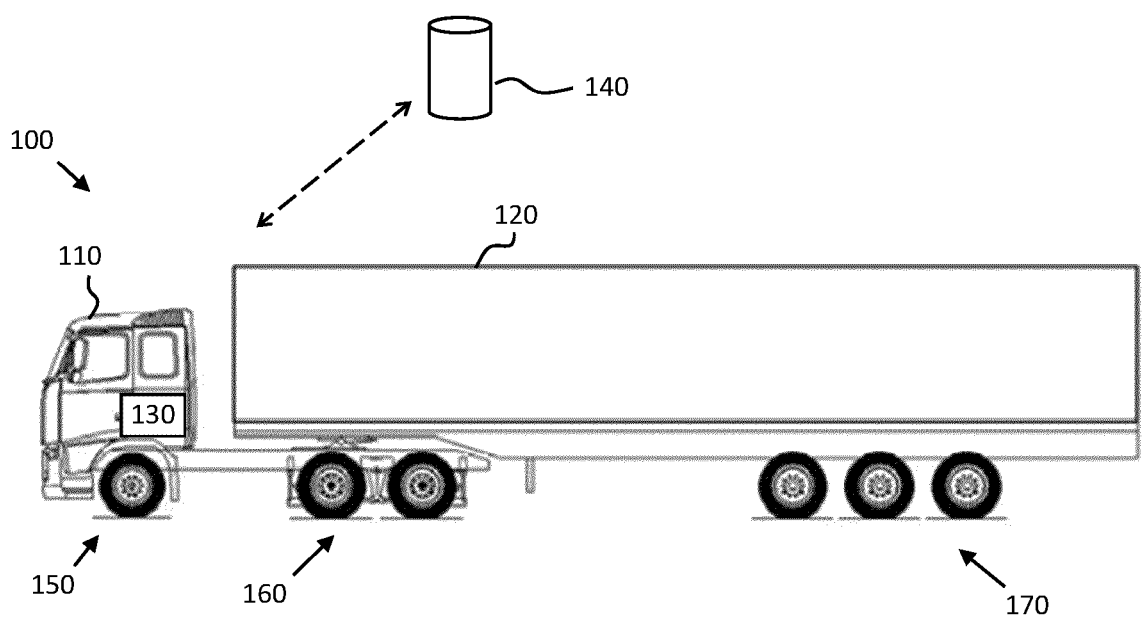
FIG. 1 schematically illustrates a vehicle for cargo transport.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 illustrates a heavy-duty vehicle 100. This particular example comprises a tractor unit 110 which is arranged to tow a trailer unit 120. The tractor 110 comprises a vehicle control unit (VCU) 130 arranged to control various functions of the vehicle 100. For instance, the VCU may be arranged to perform a vehicle motion management (VMM) function comprising control of wheel slip, vehicle unit stability, and so on. The trailer unit 120 optionally also comprises a VCU, which then controls one or more functions on the trailer 120. The VCU or VCUs may be communicatively coupled, e.g., via wireless link, to a remote server 140. This remote server may be arranged to perform various VCU configurations, and to provide data to the VCU 130, such as data regarding the make and type of tyres mounted on the vehicle 100, as will be discussed in more detail below.

The vehicle combination 100 may of course also comprise additional vehicle units, such as one or more dolly units and more than one trailer unit.

The vehicle 100 is supported by wheels, where each wheel comprises a tyre. The tractor unit 110 has front wheels 150 which are normally steered, and rear wheels 160 of which at least one pair are driven wheels. The trailer unit 120 is supported on trailer wheels 170. Trailers with driven wheels, and even a steered axle, are also possible.

The vehicle 100 is supported on the road by the wheels 150, 160, 170, and as mentioned above, the friction between road and tyre plays an important role in determining how the vehicle 100 will respond to different control commands. For instance, in low friction conditions a given amount of applied torque may result in excessive wheel slip, while the same amount of torque applied in more favorable friction conditions will result in a smooth acceleration by the vehicle.

Road friction may be characterized in terms of the road friction coefficient, often denoted $\mu$. It is a dimensionless scalar value which describes the ratio of the force of friction between two bodies and the force pressing them together. The coefficient of friction depends on the materials used; for example, rubber on ice has a relatively low coefficient of friction, while rubber on dry road has a higher coefficient of friction.

Figure 2:
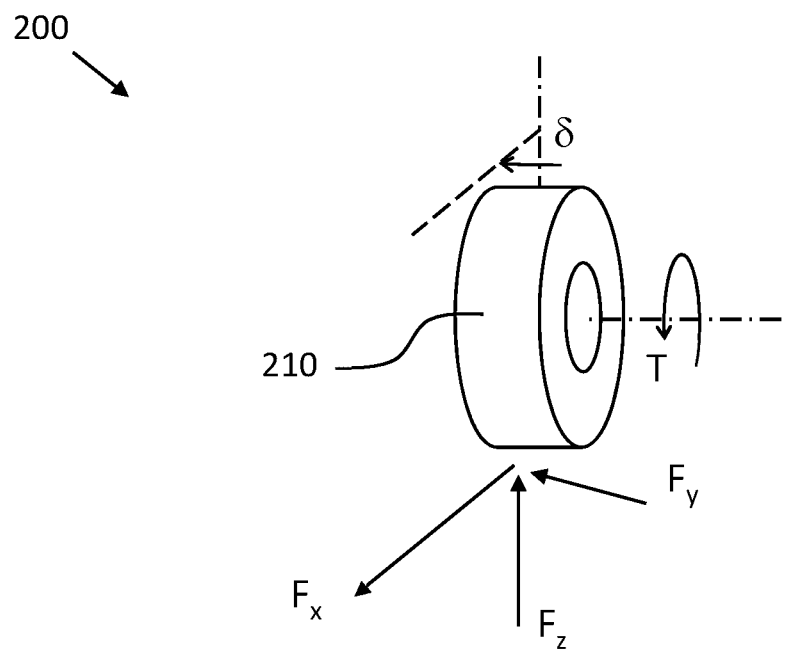
FIG. 2 illustrates wheel forces acting on a wheel.

FIG. 2 schematically illustrates a vehicle tyre 210, such as a tyre on one of the wheels 150, 160, 170 on the vehicle 100. A positive or negative torque T can be applied about its axis of rotation in order to generate longitudinal force $F_x$ to accelerate or to brake the vehicle 100. However, this longitudinal force cannot exceed the product of the normal force and the road friction coefficient $\mu F_z$. If the wheel is a steered wheel, then a steering angle $\delta$ can also be applied, which then normally generates a lateral tyre force $F_y$.

The vehicle 100 comprises a number of sensors, such as torque sensors able to accurately detect small changes in torque about an axle such as a steering axle, inertial measurement units (IMU) which accurately measure acceleration and yaw motion by the different vehicle units, and wheel speed sensors which are able to very quickly pick up minute changes in wheel speed in response to some actuator control. It has been realized that these vehicle sensors are now becoming so sensitive and fast that the response by the vehicle even to very small magnitude and short time duration vehicle control actions can be measured and analyzed by on-board vehicle control units. This can be used for estimating road friction while the vehicle is in motion without significantly impacting vehicle behavior, since only very small control actions are required to generate vehicle response data which can then be analyzed in order to infer current road friction conditions.

In particular, road friction can be estimated from the response by the vehicle to small magnitude and short time duration steering pulses, which pulses are small enough and/or of short enough time duration so as to not affect the vehicle path significantly. Thus, road friction can be estimated independently from the propulsion system. This is an advantage since the propulsion system comprises components such as a transmission which often complicate estimation of road friction. Also, by allowing for road friction estimation based on steering, a redundant method is provided which can be used as a complement to a propulsion-based road friction estimation method.

Figure 3:
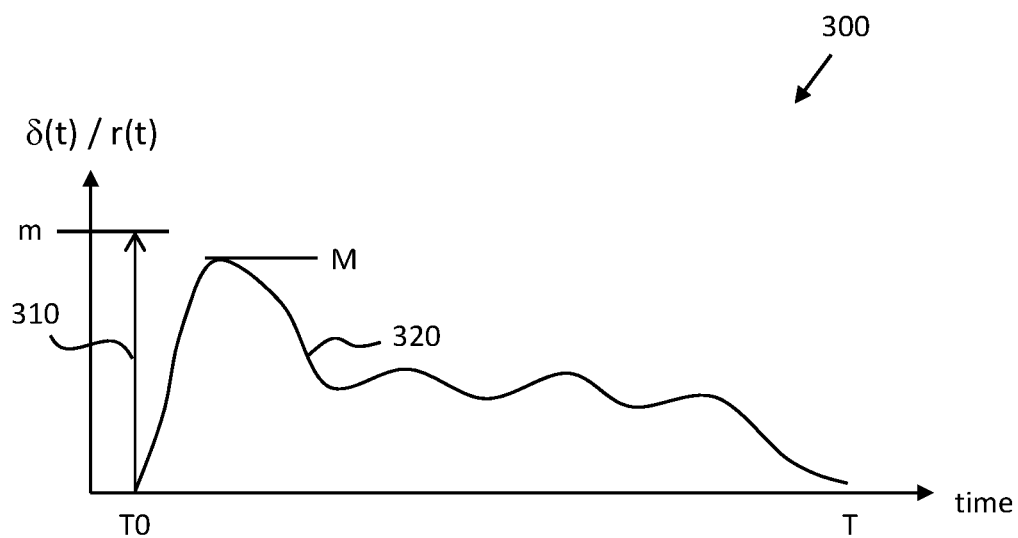
FIG. 3 illustrates a steering pulse and corresponding vehicle response.

FIG. 3 shows a graph 300 which illustrates the general concept. A steering pulse $\delta(t)$ 310 is generated at time T0. This steering pulse 310 comprises a temporary and small change in steering angle from some nominal value, preferably but not necessarily followed by a more or less immediate reversal of the steering angle back to the nominal value. The response r(t) 320 by the vehicle to this steering pulse is then recorded and subject to analysis in order to discern the current road friction conditions. Test data can be gathered by applying steering pulses when the vehicle is driving on road surfaces with known friction coefficients and stored in memory. The vehicle control unit can then repeat the measurements on road surfaces with unknown friction and investigate which impulse response in the stored data that most resembles the current measurement.

The response r(t) by the vehicle will have a magnitude characteristic, such as a peak magnitude M, and a time duration T. In a low complexity implementation, these simple measurement metrics can be used to determine road friction. More complex implementations are of course also possible and may even be preferable due to increases in accuracy. Such more complex implementations may involve frequency analysis of the impulse response, possibly augmented by machine learning techniques. The estimation methods may be parameterized and generally configured by a service technician performing a vehicle software update, or regularly by the remote server 140.

Since the steering pulse is so short and small, the vehicle will not exhibit any significant motion deviation during the friction estimation process and will not veer off the road when friction estimation is performed. Rather, a short duration sound is likely to be heard and perhaps some vibration will be experienced as the measurement is repeated a number of times to improve the estimation signal quality. Thus, the methods discussed herein can be applied while the vehicle is in motion, and even when the vehicle is running relatively fast, such as around 80 km/h or even faster.

It is appreciated that the tyres on the wheels of the vehicle 100 also play a major role in determining the behavior and capabilities of the vehicle 100. A well-designed set of tyres will provide both good traction and fuel economy, while a poorly designed set of tyres, or overly worn tyres, are likely to reduce both traction and fuel economy and may even result in an unstable vehicle combination, which of course is undesired. The present disclosure also relates to software tyre models which model tyre parameters and tyre behaviors, e.g., for a given vehicle state such as a vehicle velocity, normal load, and so on. The tyre models can be used with advantage in the estimation of road friction since the properties of the tyres mounted on the vehicle 100 are of course likely to influence the response 320 by the vehicle to the steering pulse 310. For example, the tyre models disclosed herein may be used to model a relationship between generated steering pulse 310, vehicle response 320, and road friction conditions. For instance, a worn tyre may cause the vehicle to respond in a manner similar to the response by a vehicle having better tyres but driving on a road with lower friction coefficient, and vice versa.

The tyre models discussed herein are configured to be dynamically updated as the vehicle is operated. Thus, preferably, the tyre models are dynamic and not static, which means that the tyre models will be able to better and more closely model tyre parameters in dependence of, e.g., the overall driving scenario and the state of the tyres over time as the tyre characteristics change due to wear and variation in inflation pressure and temperature.

Figure 4:
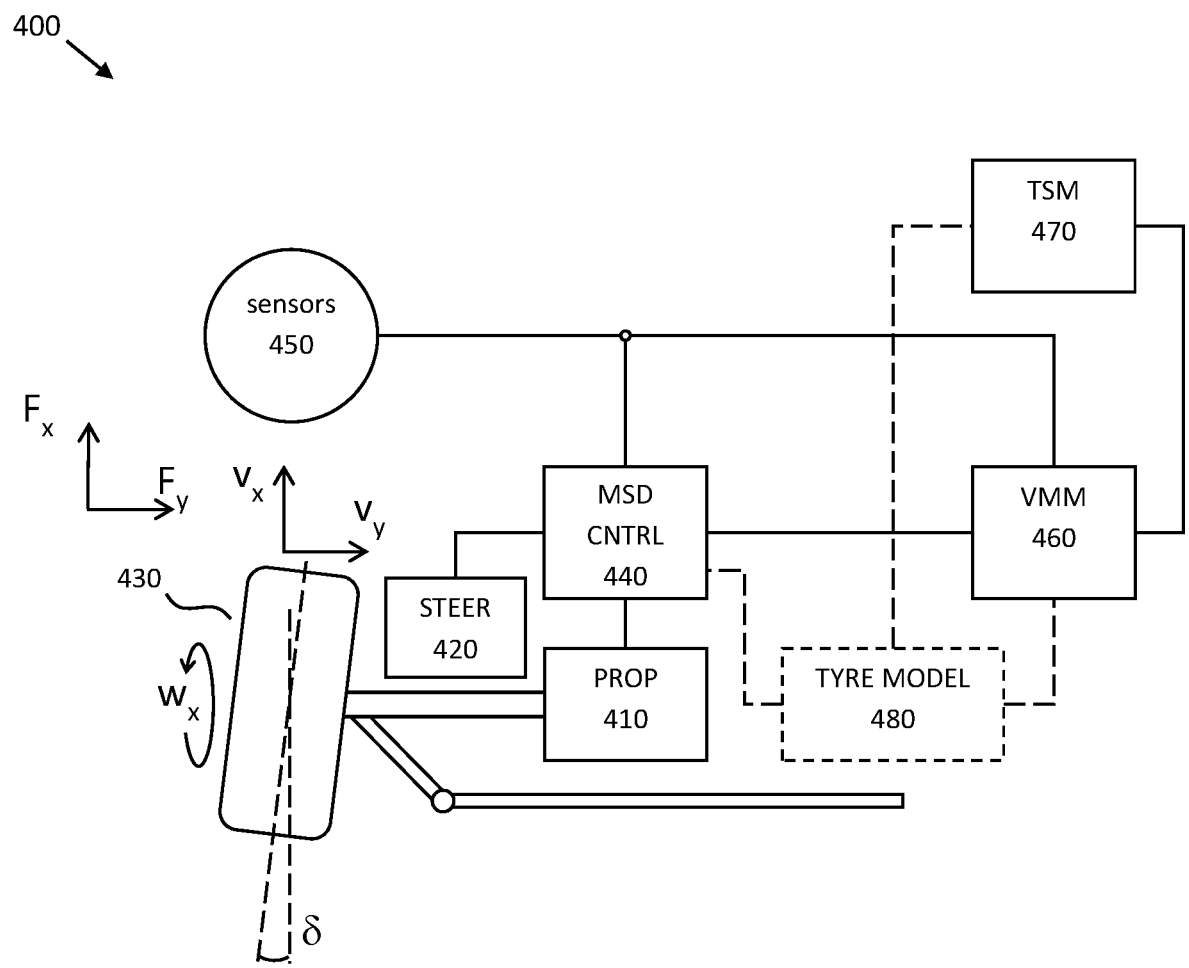
FIG. 4 is a block diagram illustrating motion support device control.

FIG. 4 schematically illustrates functionality 400 for controlling a wheel 430 by some example motion support devices (MSDs) here comprising a power steering arrangement 420 and a propulsion device 410 (such as an electric machine or a combustion engine). The power steering arrangement 420 and the propulsion device 410 are examples of actuators which can be controlled by one or more motion support device control units 440, e.g., to generate control pulses to the wheel 430 in order to induce a vehicle response which can then be recorded by vehicle sensors 450 and analyzed in order to estimate current road friction conditions.

An MSD control unit 440 may be arranged to control one or more actuators. For instance, it is not uncommon that an MSD control unit is arranged to control MSDs for both wheels of an axle. By estimating vehicle unit motion using, e.g., global positioning systems, vision-based sensors, wheel rotation speed sensors, radar sensors and/or lidar sensors, and translating this vehicle unit motion into a local coordinate system of a given wheel (in terms of, e.g., longitudinal and lateral velocity components), it becomes possible to accurately estimate wheel slip in real time by comparing the vehicle unit motion in the wheel reference coordinate system to data obtained from a wheel rotation speed sensor arranged in connection to the wheel.

Both the steering arrangement 420 and the propulsion device 410 interacts with the road surface via the tyre of the wheel. Thus, as mentioned above, the tyre properties often have a significant impact on how the different control actions by the power steering 420 and the propulsion device 410 generate vehicle motion. A software-based tyre model 480 is therefore optionally comprised in the system 400. This tyre model provides information about the tyre currently mounted on the wheel 430, its properties, and behavioral characteristics. The VMM control unit 460 and/or the MSD control unit 440 uses the information provided by the tyre model to predict consequences of different control allocations, and to interpret the response by the vehicle to, e.g., a steering pulse in order to infer current road conditions, primarily in terms of friction. The tyre model may be implemented as a look-up table or other type of function. The tyre model is parameterized, i.e., defined, by one or more tyre parameters. This means that the function itself varies in dependence of the tyre properties. The tyre model can be used to model various relationships, as exemplified above, such as a relationship or mapping between a steering pulse and generated wheel force, and/or a mapping between tyre wear rate and vehicle response to an applied steering pulse for different road friction conditions. It is appreciated that the present disclosure is not limited to any particular form of tyre model structure. Rather, it is appreciated that many different types of mathematical and/or experimentally based functions and mappings can be used as the tyre model.

Figure 5:
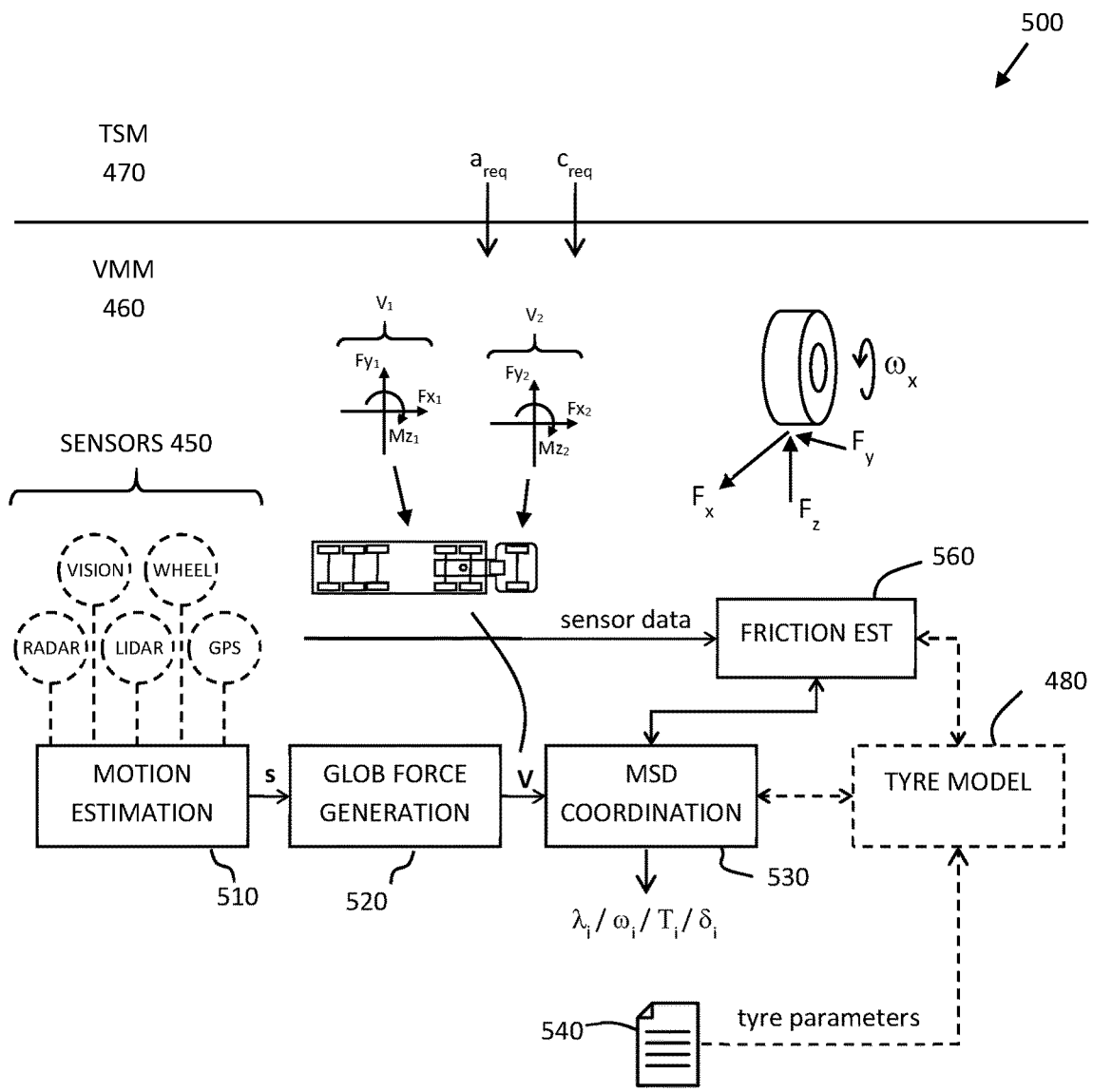
FIG. 5 shows a control architecture for controlling a vehicle.
Figure 5:
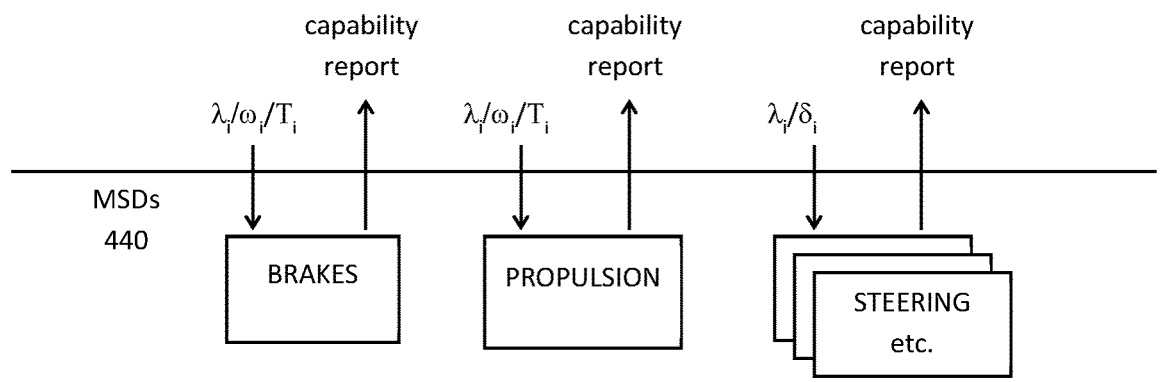

With reference also to FIG. 5, a traffic situation management (TSM) function 470 plans driving operations with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 460 which performs force allocation to meet the requests from the TSM in a safe and robust manner. The TSM function 470 may also optionally base the determination of vehicle maneuver on the tyre model 480, as indicated in FIG. 4.

The VMM function 460 operates with a time horizon of about 0.1-1.5 seconds or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. This control is advantageously based on current road friction data, obtained by the methods disclosed herein. With reference mainly to FIG. 5, the VMM function 460 performs vehicle state or motion estimation 510, i.e., the VMM function 460 continuously determines a vehicle state s (often a vector variable) comprising positions, speeds, accelerations, yaw motions, normal forces, and articulation angles of the different units in the vehicle combination by monitoring vehicle state and behavior using various sensors 450 arranged on the vehicle 100, often but not always in connection to the MSDs.

The friction estimation methods are executed in a friction estimation module 560 which triggers generation of the steering pulse by a control signal to the MSD coordination function 530, which in turn generates the steering angle commands to the power steering arrangements on the vehicle 100. The response by the vehicle is measured by the sensors 450, including the torque sensor of the power steering arrangement, and sent back to the friction estimation module 560.

The result of the motion estimation 510, i.e., the estimated vehicle state s, is input to a global force generation module 520 which determines the required global forces on the vehicle units which need to be generated in order to meet the motion requests from the TSM 470. An MSD coordination function 530 allocates, e.g., wheel forces and coordinates other MSDs such as steering and suspension. The coordinated MSDs then together provide the desired lateral $F_y$ and longitudinal $F_x$ forces on the vehicle units, as well as the required moments Mz, to obtain the desired motion by the vehicle combination 100. As indicated in FIG. 5, the MSD coordination function 530 may output any of wheel slips $\lambda_i$, wheel rotation speeds ω, torques $T_i$ and/or steering angles $\delta_i$ to the different MSDs.

The MSD coordination function 530 is optionally supported by the optional tyre model function 480 which may continuously update software-based models of the tyres on the vehicle. The MSD coordination function 530 may, for instance, use the tyre model to determine a relationship between wheel slip and generated wheel force. The tyre model is parameterized by one or more tyre parameters, such as tyre wear, tyre normal load, tyre slip stiffness, etc. These tyre parameters may of course be pre-configured. However, additional advantages may be obtained if the tyre parameters are estimated or otherwise determined based on tyre data obtained from memory 540 or based on tyre data obtained from one or more sensors 450.

Figure 6:
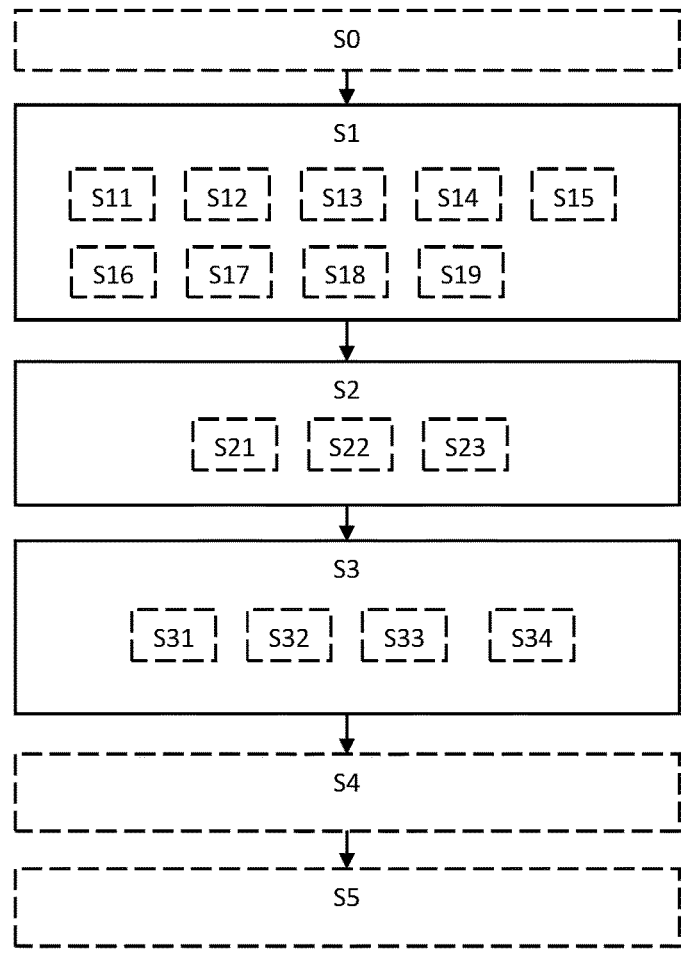
FIG. 6 is a flow chart illustrating example methods.
Figure 7:
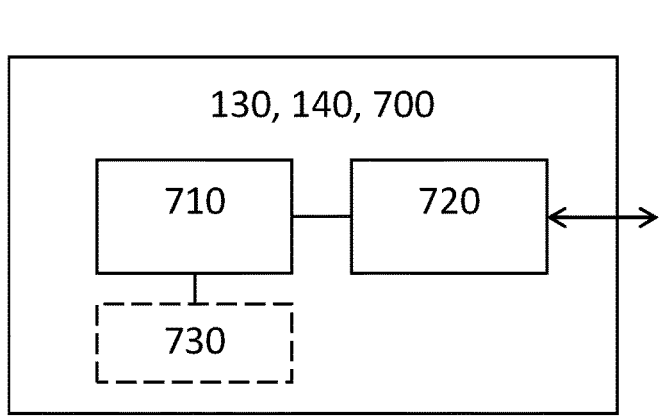
FIG. 7 schematically illustrates a sensor unit and/or a control unit.

To summarize the above discussion, with reference also to FIG. 7, FIG. 6 shows a flow chart which illustrates a method performed in a control unit 130, 140, 700 of a heavy-duty vehicle 100 for estimating road friction. The method comprises, while the vehicle 100 is in motion, generating S1 a steering pulse having a limited time duration and a limited magnitude, measuring S2 a response by the vehicle 100 to the steering pulse, and estimating S3 a road friction value based on the measured response by the vehicle 100. As discussed above, the steering pulse may be generated by sending a command from an MSD control unit 440 to a power steering arrangement 420. The pulse is preferably of such limited time duration and/or magnitude that it does not have any significant effect on the vehicle path or motion behavior. However, the vehicle still responds to the pulse with a strength sufficient for measuring it by one or more sensors arranged on the vehicle 100.

It is appreciated that different types of vehicles respond differently to a given stimuli, very heavy vehicles will perhaps need a stronger steering pulse in order for the vehicle to exhibit a measurable response strong enough for accurately estimating road friction. Thus, according to some aspects, the time duration and/or the magnitude of the steering pulse is limited S11 in dependence of one or more dynamic properties of the heavy-duty vehicle 100. Proper settings for the steering pulse in terms of steering angle and time duration may, e.g., be configured at the factory when the vehicle is assembled, or regularly updated by, e.g., the remote server 140. The steering pulse may be generated S12 as an impulse comprising an abruptly applied steering angle change followed by an immediate reversal of the applied steering angle to its nominal value. The response by the vehicle 100 will then be an impulse response, which can be analyzed using methods which will be discussed in more detail below. An example of such a steering impulse 310 and resulting vehicle response 320 was discussed above in connection to FIG. 3. However, other forms of input steering stimuli can also be used. For instance, the applied steering pulse may be generated S13 as a step function comprising an abruptly applied steering angle starting from a nominal steering angle. However, this type of step function steering pulse is more likely to affect the vehicle path compared to a steering impulse which comprises a reversal back to a nominal value.

With reference again to FIG. 5, the MSD coordination function 530 can also be used to compensate for the steering pulse at least partly. For instance, suppose that a large magnitude steering impulse is applied, which would cause the vehicle 100 to veer to the left if no other actions were taken. The MSD coordination function 530 is, according to some aspects arranged to perform motion prediction, whereby it can predict the consequences of applying said steering pulse. The MSD coordination function 530 may then perform MSD coordination to compensate for the steering pulse. In other words, the method optionally comprises compensating S14 for the steering pulse by one or more other motion support devices of the vehicle 100. For instance, the veering to the left may be compensated for by applying a short duration brake torque on the right hand side of the vehicle 100, or a short duration positive torque pulse on the right hand side of the vehicle to balance up the yaw motion caused by the steering pulse. It is, however, appreciated that such vehicle motion compensation will invalidate any vehicle response measurements involving yaw motion, lateral forces, or the like. Nevertheless, it may be useful if, e.g., the main source of information for evaluating road friction is the torque applied by the power steering arrangement in order to generate the steering pulse.

Most heavy-duty vehicles 100 will be able to accommodate a steering pulse on the order of a few degrees and a time duration below one second or so, without exhibiting any significant path deviation or hazardous yaw moment. However, it is appreciated that some vehicle types are more sensitive than other to this type of steering pulse. Thus, the method optionally comprises configuring S15 the magnitude and/or the time duration of the steering pulse in dependence of a type of the heavy-duty vehicle 100. Generally, the more robust the vehicle is, and the more heavily laden the vehicle is, the stronger the steering pulse which can be tolerated. For instance, it may be advantageous to configure S16 the magnitude and/or the time duration of the steering pulse in dependence of a cargo load or gross weight of the heavy-duty vehicle 100. Also, if countermeasures such as the compensation by the MSD coordination function discussed above is used, then stronger steering pulses can be applied compared to where no compensation is performed.

It may be so that some vehicles become more sensitive to an applied steering pulse when they are moving with high speed compared to when they are moving more slowly. Consequently, the methods optionally comprise configuring S17 the magnitude and/or the time duration of the steering pulse in dependence of a current speed of the heavy-duty vehicle 100. Generally, the faster the vehicle is moving, the more kinetic energy it stores, and the smaller the steering pulse needs to be in order to generate a response by the vehicle which is large enough to be measured and used to estimate road friction. Of course, it may also be advantageous to configure S18 the magnitude and/or the time duration of the steering pulse in dependence of an operating environment of the heavy-duty vehicle 100. For instance, a different steering pulse magnitude and/or time duration may be suitable for estimating road friction on a gravel road at low speed compared to a freeway. The effective wheelbase of the vehicle is also likely to have an impact on the magnitude and/or the time duration of the steering pulse. For a longer wheelbase, a larger steering angle is often needed to obtain the same curvature. So, longer wheelbase vehicles can tolerate a larger steering impulse than shorter wheelbase vehicles without disturbing the motion too much.

According to the discussion above, what constitutes a limited time duration, and a limited magnitude is to be construed broadly and taking factors such as vehicle type, operating environment, and vehicle speed into account. However, for most heavy-duty vehicles, the method may comprise generating S19 a steering pulse having a magnitude between 1-5 degrees, and preferably between 2-3 degrees, with a time duration between 0.1-1.0 seconds, and preferably between 0.2-0.5 seconds or so.

The response by the vehicle to the applied steering pulse can be measured in different ways using a single sensor or a combination of sensors. For instance, the method may comprise measuring S21 the response by the vehicle 100 as an applied torque by a power steering system of the vehicle 100. This is one of the preferred ways to measure response by the vehicle, since it has been shown to provide relevant measurement results even or small magnitude steering pulses of limited time duration. Basically, with reference to FIG. 5, a steering angle command for a given change in steering angle is transmitted from the VMM 460 to the MSD control unit 440, which then controls the power steering arrangement to apply the change in steering angle. A command to reverse the steering angle is transmitted immediately thereafter. The power steering system then measures the applied torque required to generate the change in steering angle and records this data, e.g., as a vector of torque values sampled at sufficiently high rate, e.g., on the order of a few kHz. The data is then sent back to the friction estimation function 560 in the VMM 460 which performs an analysis in order to estimate current road friction. This analysis may be performed at different levels of complexity. For instance, a simple way to determine road friction from such torque data is to evaluate the required torque to cause the change in steering angle. If the wheel steers very easily, then the measured torque values will be relatively small, which implies low friction. On the other hand, if more significant torque is required to turn the wheel, the probable road friction is higher. This torque can also be evaluated in dependence of the current vehicle speed over ground and vehicle load, since a stationary or more slowly moving vehicle often requires more torque to change steering angle compared to a more fast-moving vehicle.

The methods may also comprise measuring S22 the response by the vehicle 100 as a vehicle yaw motion resulting from the applied steering pulse. Naturally, if there is very little friction between the vehicle and the road, then also very little yaw motion is expected from a given steering pulse. On the other hand, if there is high friction, then this same steering pulse is likely to result in more yaw motion, at least if the vehicle is travelling at the same speed. The friction estimation function 560 may be configured with look-up tables or the like which allows for converting a recorded yaw motion resulting from a given steering pulse into an estimated road friction coefficient. These look-up tables are preferably also function of vehicle speed and/or vehicle load. In a similar manner, the methods may comprise measuring S23 the response by the vehicle 100 as a lateral force and/or lateral acceleration generated by the applied steering pulse. Lateral acceleration is preferably then measured on the steered axle of the vehicle.

The road friction conditions may be estimated from the measured response by the vehicle to the applied steering pulse in a number of different ways which can be applied independently from each other or in combination. A preferred method comprises estimating S31 the road friction value based on a frequency analysis of the measured response. For instance, the occurrence of oscillations in the vehicle response to a steering pulse has been observed in slippery road conditions. A more resolute response with less oscillating behavior is, on the other hand, often indicative of higher road friction.

Alternatively, or as a complement, and with reference to FIG. 3, the method comprises estimating S34 the road friction value based on a magnitude M and/or a time duration T of the measured response.

Methods involving machine learning may also be applied to the measured vehicle response to estimate current road friction conditions. Thus, the methods may comprise estimating S32 the road friction value using a machine learning method applied to the measured response. Such methods may of course involve traditional neural networks which can be trained by measurement data obtained on stretches of road with known friction coefficients. The neural networks may be fed with raw response data and/or preprocessed measurement data, such as frequency domain representations of the measurement data. The detection mechanisms are advantageously based on machine learning techniques. Different types of machine learning techniques have been applied with success, but it has been found that algorithms based on random forest techniques are particularly effective and provide robust road friction estimation.

Random forests or random decision forests represent an ensemble learning method for classification, regression and other tasks that operate by constructing a multitude of decision trees at training time and outputting the class that is the mode of the classes (classification) or mean/average prediction (regression) of the individual trees. Random decision forests are associated with the advantage of being able to correct for decision trees' habit of overfitting to their training set. Random forests generally outperform decision tree-based algorithms. As an alternative to random forest classification methods, a less complex decision tree algorithm can be used, often referred to as regression tree algorithms, which is basically a single tree random forest algorithm.

As mentioned above, the tyres on the vehicle also impact the response by the vehicle to an applied steering pulse. Less worn tyres of course provide a better grip compared to almost worn-out tyres, which will be reflected in the response be the vehicle to a given steering pulse. Thus, advantageously, the methods optionally comprise estimating S33 the road friction value based on a software-based model of a tyre of the vehicle 100. Examples of such software-based tyre models were discussed above. Of course, these software-based tyre models may also be updated using data obtained from the friction estimation algorithms discussed herein, i.e., the methods may comprise updating S4 a software-based model of a tyre of the vehicle 100 based on the measured response.

The actions by the herein proposed control units are likely to be noticeable by a driver or a passenger in the heavy-duty vehicle 100, for instance, by an increased level of noise or a bit of jerky motion by the vehicle. In order to inform the driver about the reason for the noise and behavior by the vehicle, the methods may comprise triggering S5 a notification to a driver of the vehicle in connection to generating the steering pulse. This notification may, e.g., comprise a symbol on a dashboard or the like, similar to when an anti-lock braking system (ABS) kicks in, or when an anti-skid system engages.

The methods disclosed herein are advantageously used with autonomous or semi-autonomous vehicles where no driver is present to infer road conditions based on the general feel of the vehicle and on visual inspection of the road in front of the vehicle. However, a driver of a manually operated vehicle may also wish to trigger the methods in order to determine road friction. This function can, e.g., be used by a driver which feels unsure about road conditions and wants to get a "second opinion" of if the road is slippery or if it only looks like it is slippery. This could for instance be the case if the road is covered in snow that can be wet (very slippery) or dry (not so slippery). Towards this end, the herein disclosed methods may comprise generating 50 the steering pulse in response to a request from a driver of the vehicle 100. This request may, e.g., be generated by some form of input control, like a button or option on a touchscreen.

FIG. 7 schematically illustrates, in terms of a number of functional units, the components of a control unit 700 according to embodiments of the discussions herein, such as any of the VCUs 130, 140. This control unit 700 may be comprised in the articulated vehicle 1. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 700 to perform a set of operations, or steps, such as the methods discussed in connection to FIG. 7. For example, the storage medium 730 may store the set of operations, and the processing circuitry 710 may be configured to retrieve the set of operations from the storage medium 730 to cause the control unit 700 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

Figure 8:
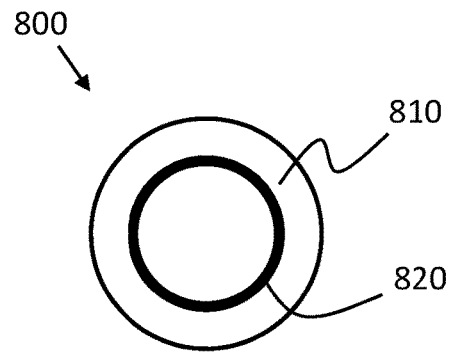
FIG. 8 shows an example computer program product.

FIG. 8 illustrates a computer readable medium 810 carrying a computer program comprising program code means 820 for performing the method illustrated in FIG. 6, when said program product is run on a computer. The computer readable medium and the code means may together form a computer program product 800.

The invention claimed is:

1. A method performed by a control unit of a heavy-duty vehicle for estimating road friction, the method comprising, while the vehicle is in motion,
   generating a steering pulse having a limited time duration and a limited magnitude,
   measuring a response by the vehicle to the steering pulse, and
   estimating a road friction value based on the measured response by the vehicle,
   wherein the time duration and/or the magnitude of the steering pulse is limited in dependence of one or more dynamic properties of the heavy-duty vehicle, and
   the magnitude and/or time duration of the steering pulse are configured in dependence of a current speed of the heavy-duty vehicle.

2. The method according to claim 1, comprising generating the steering pulse as an impulse comprising an abruptly applied steering angle followed by an immediate reversal of the applied steering angle.

3. The method according to claim 1, comprising generating the steering pulse as a step function comprising an abruptly applied steering angle.

4. The method according to claim 1, comprising compensating for the steering pulse by one or more other motion support devices of the vehicle.

5. The method according to claim 1, comprising configuring the magnitude and/or the time duration of the steering pulse in dependence of a type of the heavy-duty vehicle.

6. The method according to claim 1, comprising configuring the magnitude and/or the time duration of the steering pulse in dependence of a cargo load or gross weight of the heavy-duty vehicle.

7. The method according to claim 1, comprising configuring the magnitude and/or the time duration of the steering pulse in dependence of an operating environment of the heavy-duty vehicle and/or in dependence of a wheelbase of the heavy-duty vehicle.

8. The method according to claim 1, comprising generating a steering pulse having a magnitude between 1-5 degrees.

9. The method according to claim 1, comprising measuring the response by the vehicle as an applied torque by a power steering system of the vehicle.

10. The method according to claim 1, comprising measuring the response by the vehicle as a vehicle yaw motion resulting from the applied steering pulse.

11. The method according to claim 1, comprising measuring the response by the vehicle as a lateral force and/or lateral acceleration generated by the applied steering pulse.

12. The method according to claim 1, comprising estimating the road friction value based on a frequency analysis of the measured response.

13. The method according to claim 1, comprising estimating the road friction value using a machine learning method applied to the measured response.

14. The method according to claim 1, comprising estimating the road friction value based on a software-based model of a tire of the vehicle.

15. The method according to claim 1, comprising estimating the road friction value based on a magnitude and/or a time duration of the measured response.

16. The method according to claim 1, comprising updating a software-based model of a tire of the vehicle based on the measured response.

17. The method according to claim 1, comprising triggering a notification to a driver of the vehicle in connection to generating the steering pulse.

18. The method according to claim 1, comprising generating the steering pulse in response to a request from a driver of the vehicle.

19. A heavy-duty vehicle comprising sensors and motion support devices, the heavy-duty vehicle also comprising a control unit arranged to estimate road friction, the control unit comprising processing circuitry configured to perform the steps of the method according to claim 1.

20. A computer program comprising program code for performing the steps of claim 1 when said program is run on a computer or on processing circuitry of a control unit comprised in a heavy-duty vehicle.

21. A non-transitory computer readable medium carrying a computer program comprising program code for performing the steps of claim 1 when said program code is run on a computer or on processing circuitry of a control unit comprised in a heavy-duty vehicle.

22. A control unit for a heavy-duty vehicle arranged to estimate road friction, the control unit comprising processing circuitry configured to perform the steps of the method according to claim 1 when comprised in a heavy-duty vehicle.

* * * * *